(12) United States Patent
Kamei (10) Patent No.: US 8,680,732 B2
(45) Date of Patent: Mar. 25, 2014

(54) ROTARY ELECTRIC MACHINE

(75) Inventor: Takeshi Kamei, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 68 days.

(21) Appl. No.: 13/283,660

(22) Filed: Oct. 28, 2011

(65) Prior Publication Data

US 2012/0104892 A1    May 3, 2012

(30) Foreign Application Priority Data

Nov. 2, 2010 (JP) .................................. 2010-245757

(51) Int. Cl.
*H02K 21/12* (2006.01)

(52) U.S. Cl.
USPC ................................ 310/156.53; 310/156.57

(58) Field of Classification Search
USPC ....................................... 310/156.53–156.58
See application file for complete search history.

(56) References Cited

U.S. PATENT DOCUMENTS

| | | | | |
|---|---|---|---|---|
| 6,072,256 | A * | 6/2000 | Shon et al. ............... | 310/156.53 |
| 6,353,275 | B1 * | 3/2002 | Nishiyama et al. ...... | 310/156.53 |
| 6,664,688 | B2 * | 12/2003 | Naito et al. ............. | 310/156.01 |
| 7,948,138 | B2 | 5/2011 | Hattori et al. | |
| 7,960,886 | B2 * | 6/2011 | Miura et al. ............. | 310/156.57 |
| 8,080,908 | B2 * | 12/2011 | Matsubara et al. ............. | 310/61 |
| 2003/0025414 | A1 | 2/2003 | Kaneko et al. | |
| 2006/0028082 | A1 * | 2/2006 | Asagara et al. .......... | 310/156.53 |
| 2006/0113858 | A1 * | 6/2006 | Hino et al. ............... | 310/156.53 |
| 2007/0145849 | A1 * | 6/2007 | Okamoto et al. ........ | 310/156.53 |
| 2007/0200447 | A1 * | 8/2007 | Adaniya et al. .......... | 310/156.53 |
| 2009/0079287 | A1 | 3/2009 | Hattori et al. | |
| 2009/0115279 | A1 | 5/2009 | Spaggiari | |

FOREIGN PATENT DOCUMENTS

| | | |
|---|---|---|
| CN | 101167230 | 4/2008 |
| JP | 2003-047185 | 2/2003 |
| JP | 2003-088071 | 3/2003 |
| JP | 2003-259577 | 9/2003 |
| JP | 2006-311730 | 11/2006 |
| JP | 2006-325348 | 11/2006 |
| JP | 2008-278553 | 11/2008 |
| JP | 2008-545364 | 12/2008 |

OTHER PUBLICATIONS

Japanese Office Action for corresponding JP Application No. 2010-245757, Feb. 19, 2013.
Chinese Office Action for corresponding CN Application No. 201110339450.X, Sep. 2, 2013.

* cited by examiner

*Primary Examiner* — Thanh Lam
(74) *Attorney, Agent, or Firm* — Ditthavong Mori & Steiner, P.C.

(57) ABSTRACT

A rotary electric machine includes a rotor core, and a permanent magnet embedded in proximity to an outer circumferential portion of the rotor core, in which gaps for reducing irreversible demagnetization of the permanent magnet are provided on portions on an inner circumference side of the permanent magnet, the portions being of the rotor core in proximity to an inner circumferential surface of the permanent magnet.

12 Claims, 11 Drawing Sheets

ROTARY ELECTRIC MACHINE

CROSS-REFERENCE TO RELATED APPLICATIONS

The present application claims priority under 35 U.S.C. §119 to Japanese Patent Application No. 2010-245757 filed Nov. 2, 2010. The contents of this application are incorporated herein by reference in their entirety.

BACKGROUND OF THE INVENTION

1. Field of the Invention

The present invention relates to a rotary electric machine.

2. Discussion of the Background

Conventionally, a rotary electric machine has been known, in which permanent magnets are embedded in proximity to an outer circumferential portion of a rotor core (for example, refer to Japanese Unexamined Patent Publication No. 2003-47185).

In the rotary electric machine in the above patent document, a plurality of permanent magnets are embedded at an equal interval along a circumferential direction in proximity to the outer circumferential portion of the rotor core. Moreover, in the rotary electric machine in the above patent document, a stator core is provided so as to face to the rotor core in a radial direction, and in addition, windings are provided on the stator core. Then, the rotary electric machine is configured so that the rotor core rotates by magnetic fields generated from the windings and magnetic fields of the permanent magnets. Meanwhile, in the rotary electric machine of the above patent document, magnetization of end portions of the permanent magnets may be locally demagnetized irreversibly by an armature reaction ampere turn generated from the windings (that is, a magnetomotive force generated from the windings).

In another conventional rotary electric machine different from one in the above patent document, in order to reduce the irreversible demagnetization, a structure has been proposed, in which gaps are provided in portions of the rotor core on an outer circumference side of the permanent magnets.

SUMMARY OF THE INVENTION

According to one aspect of the present invention, a rotary electric machine includes a rotor core, and a permanent magnet embedded in proximity to an outer circumferential portion of the rotor core, in which gaps for reducing irreversible demagnetization of the permanent magnet are provided on portions on an inner circumference side of the permanent magnet, the portions being of the rotor core in proximity to an inner circumferential surface of the permanent magnet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

(First Embodiment)

First, a description is made below of a configuration of a rotary electric machine 100 according to a first embodiment of the present invention with reference to FIG. 1 to FIG. 4.

Figure 1:
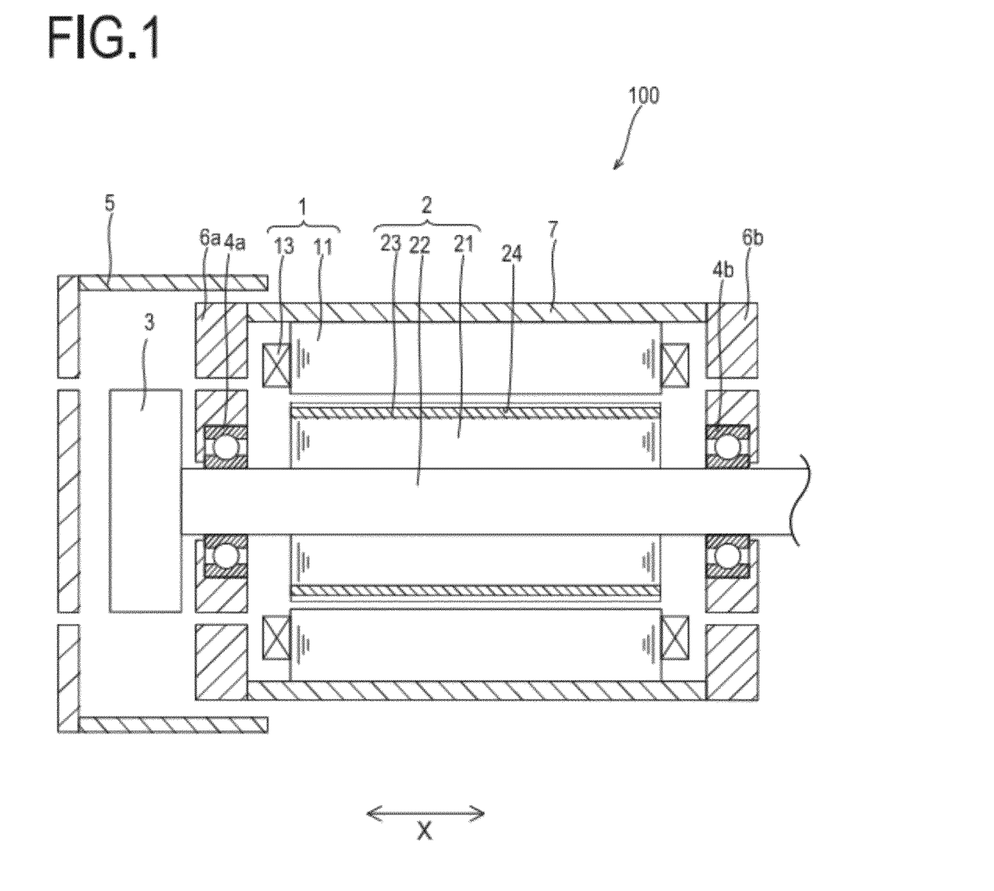
FIG. 1 is a cross-sectional view of a rotary electric machine according to a first embodiment of the present invention.

As shown in FIG. 1, the rotary electric machine 100 includes a stator 1, a rotor 2, a fan 3, bearings 4a and 4b, a fan cover 5, brackets 6a and 6b, and a frame 7.

The stator 1 and the rotor 2 are arranged in an inside of the frame 7. Moreover, the stator 1 and the rotor 2 are arranged so as to face to each other in a radial direction of the rotor 2. Furthermore, onto both ends of the frame 7, brackets 6a and 6b are individually attached. Onto the brackets 6a and 6b, the bearings 4a and 4b including ball bearings and the like are attached, respectively. In the rotor 2, a shaft 22 to be described later is provided so as to penetrate the rotor 2. The shaft 22 is supported by the bearings 4a and 4b, which are provided on the brackets 6a and 6b, respectively. The fan 3 is attached onto one side end of the shaft 22. The fan cover 5 is attached onto the bracket 6a so as to cover the fan 3.

Figure 2:
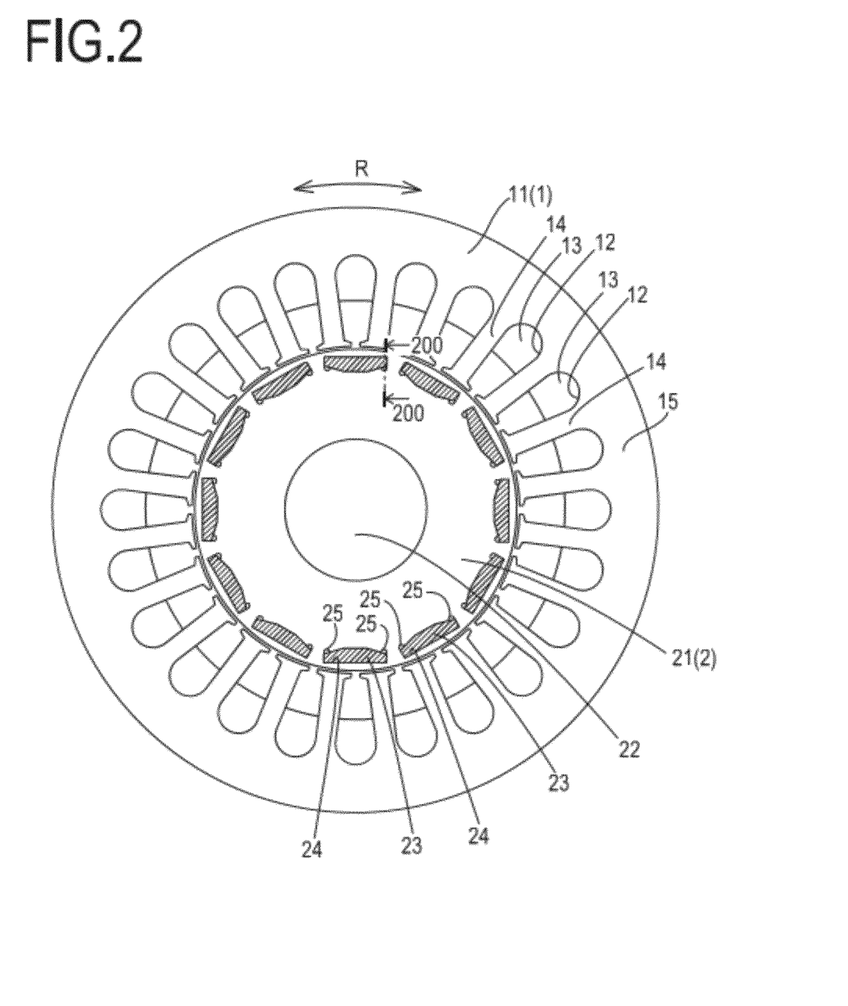
FIG. 2 is a plan view showing a stator and a rotor of the rotary electric machine according to the first embodiment of the present invention.

As shown in FIG. 2, the stator 1 includes a stator core 11 in which a plurality of slots 12 are formed, and windings 13. The plurality of slots 12 are formed in an inside of the stator core 11. In FIG. 2, the slots 12, of which number is twenty four, are formed in the stator core 11. The stator core 11 is formed, for example, by stacking electromagnetic steel plates on one another. The windings 13 are wound between the slots 12. Note that the windings 13 are wound in a concentrated winding manner or a distributed winding manner. Each portion of the stator core 11, which is located between the slot 12 and the slot 12, forms a teeth portion 14. Moreover, an outer circumferential portion of the stator core 11 forms a yoke portion 15.

The rotor 2 includes a rotor core 21, the shaft 22, and a plurality of permanent magnets 23. The rotor core 21 is formed, for example, by stacking electromagnetic steel plates on one another. Note that the rotor core 21 may be the one in which a ferromagnetic member such as iron is bent into a circular shape, or may be a cylindrical ferromagnetic member. The cylindrical ferromagnetic member may be made of a casting or the like. The shaft 22 is provided so as to penetrate a center of the rotor core 21. The plurality of permanent magnets 23 are embedded in an outer circumferential portion of the rotor core 21. Moreover, the plurality of permanent magnets 23 are arranged at a substantially equal interval in a direction along a rotation direction R of the rotor core 21. The permanent magnets 23 adjacent to one another are arranged at a predetermined interval. The permanent magnets 23 are arrayed in the rotation direction R of the rotor core 21 so that magnetic poles (N pole, S pole) on an outer circumference side thereof can be alternately reversed. Moreover, in FIG. 2, the permanent magnets 23, of which number is twelve, are provided. Note that the permanent magnets 23 are embedded (fitted) into hole portions 24 formed in the rotor core 21. Moreover, as shown in FIG. 3, the permanent magnets 23 are formed so as to extend from one side end of the rotor core 21 in an X-direction (rotation axis direction) to the other side end thereof.

Figure 4:
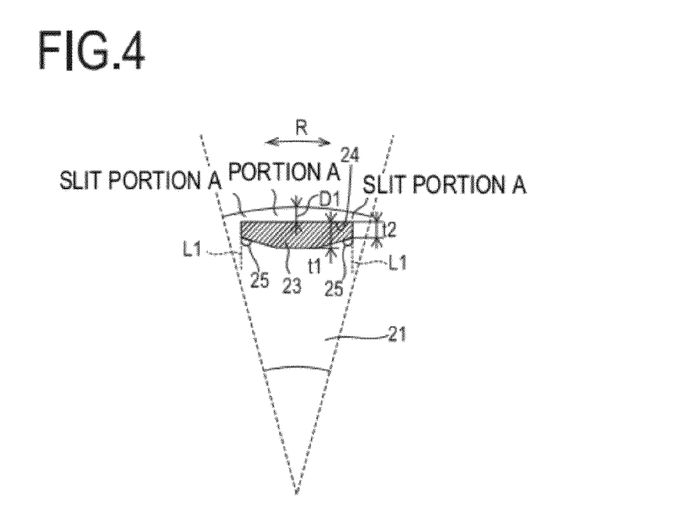
FIG. 4 is a view showing a permanent magnet and gaps per pole of the rotary electric machine according to the first embodiment of the present invention.

As shown in FIG. 4, each of the permanent magnets 23 has a hexagonal cross section when viewed from the above. Specifically, an outer circumferential surface of the permanent magnet 23 is formed substantially flat. Here, in the first embodiment, the permanent magnet 23 is configured so that a radial thickness t1 of a center portion of the permanent magnet 23 can be larger than a thickness t2 of end portions thereof in a direction along the rotation direction R of the rotor core 21 (t1>t2). That is, the permanent magnet 23 is formed into a shape protruding toward an inner circumference side. Accordingly, a magnitude of a magnetic flux generated by the permanent magnet 23 becomes large in the center portion of the permanent magnet 23, and becomes small in the end portions thereof.

Here, in the first embodiment, gaps 25 are provided at portions of the rotor core 21 in proximity to an inner circumferential surface of the permanent magnet 23, the portions also being both end portions of the permanent magnet 23 along the rotation direction R of the rotor core 21. The gaps 25 have a function to reduce irreversible demagnetization of the permanent magnet 23, which is caused by an armature reaction ampere turn generated from the windings 13 of the stator core 11. The gaps 25 are formed so as to come into contact with the inner circumferential surface of the permanent magnet 23. The gaps 25 are provided inside from extensions L1 of side end surfaces of the permanent magnet 23. Note that the gaps 25 have a substantially semicircular shape when viewed from the above.

Figure 3:
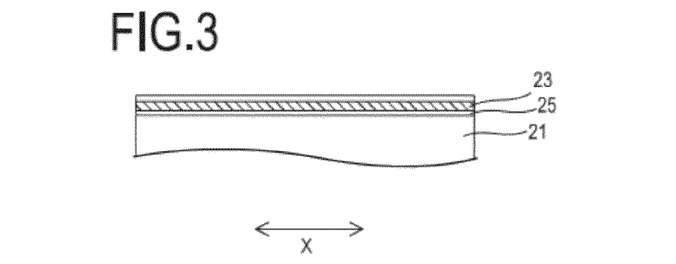
FIG. 3 is a cross-sectional view along line 200-200 of FIG. 2.

In the first embodiment, as shown in FIG. 3, each of the gaps 25 is formed so as to extend from the one side end of the rotor core 21 in the X-direction to the other side end thereof. Each of the gaps 25 is provided so as to continue with the hole portion 24 in which the permanent magnet 23 of the rotor core 21 is embedded. Note that, as shown in FIG. 1, on end portions of the rotor core 21 in the X-direction (rotation axis direction), end rings (disc-like members) are not provided, and the gaps 25 are exposed.

Figure 5:
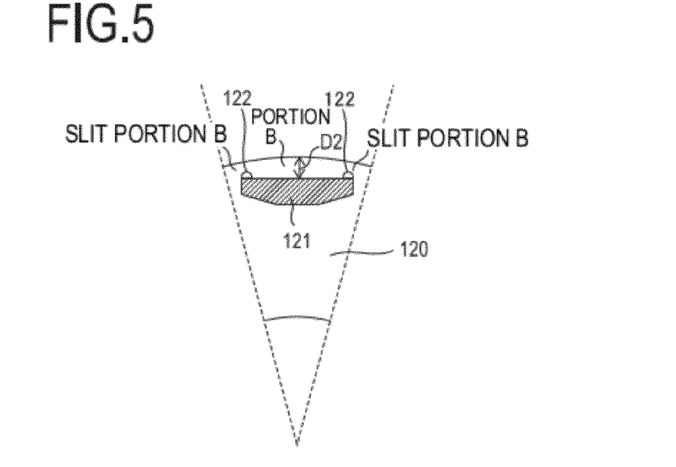
FIG. 5 is a view showing a permanent magnet and gaps per pole of a rotary electric machine according to a comparative example.

Next, by referring to FIG. 4 and FIG. 5, a description is made of reduction of the irreversible demagnetization of the permanent magnet by the gaps and reduction of deformation of slit portions of the rotor core, which is based on positions at which the gaps are arranged, while comparing a comparative example (refer to FIG. 5) and the first embodiment with each other.

First, as shown in FIG. 5, in a rotor core 120 according to the comparative example, in an outer circumferential portion of the rotor core 120, a permanent magnet 121 having the same shape as that of the permanent magnet 23 of the first embodiment is embedded. That is, the permanent magnet 121 has a hexagonal cross section when viewed from the above. Moreover, gaps 122 are provided at portions in proximity to an outer circumferential surface of the permanent magnet 121 according to the comparative example, the portions also being both end portions thereof along a rotation direction R of the rotor core 120. In a similar way to the gaps 25 (refer to FIG. 3) of the first embodiment, these gaps 122 are also formed so as to extend from one side end of the rotor core 120 in an X-direction to the other side end thereof.

Here, the permanent magnet 121 may be irreversibly demagnetized due to the armature reaction ampere turn (magnetomotive force) by each of the windings 13 (refer to FIG. 2) wound around the stator core 11. That is, a residual magnetic flux density, which is originally inherent in the permanent magnet 121, may be irreversibly reduced due to the armature reaction ampere turn by the winding 13. However, in the comparative example, by an effect of the gaps 122 provided on both end portions of the outer circumferential surface of the permanent magnet 121, a magnetic field that affects the permanent magnet 121 becomes small by being shared by the gaps 122. As a result, the irreversible demagnetization of the permanent magnet 121 is reduced.

In a similar way to the permanent magnet 121 according to the comparative example, which is shown in FIG. 5, the permanent magnet 23 of the first embodiment, which is shown in FIG. 4, may also be irreversibly demagnetized due to the armature reaction ampere turn (magnetomotive force) by the winding 13 (refer to FIG. 2) wound around the stator core 11. However, by an effect of the gaps 25 provided on both end portions of the inner circumferential surface of the permanent magnet 23, a magnetic field that affects the permanent magnet 23 similarly becomes small by being shared by the gaps 25. As a result, the irreversible demagnetization of the permanent magnet 23 is reduced.

Here, unlike the comparative example shown in FIG. 5, in which the gaps 122 are provided on the outer circumferential surface side of the permanent magnet 121, in the first embodiment, the gaps 25 are provided in proximity (inner circumferential surface) to the inner circumferential surface of the permanent magnet 23. Accordingly, a distance D1 (refer to FIG. 4) between the permanent magnet 23 and the outer circumference of the rotor core 21 in the first embodiment becomes smaller than a distance D2 (refer to FIG. 5) between the permanent magnet 121 and the rotor core 120 in the comparative example (D1<D2). As a result, in the case where the rotor core 21 rotates, a centrifugal force applied to a portion A (refer to FIG. 4) of the rotor core 21 between the permanent magnet 23 and the outer circumference of the rotor core 21 becomes small by an amount that a mass of the portion A becomes smaller than a mass of a portion B (refer to FIG. 5) of the rotor core 120 between the permanent magnet 121 and the outer circumference of the rotor core 120 in the comparative example, and accordingly, deformation of slit portions A of the rotor core 21 is reduced. Note that it is necessary that a concentrated stress ($N/mm^2$) caused at the slit portions A of the rotor core 21 be made smaller than a yield value ($N/mm^2$, a limit value indicating elasticity) of a material (for example, iron) of the rotor core 21. Accordingly, even if the slit portions A of the rotor core 21 are temporarily deformed by the centrifugal force, the slit portions A of the rotor core 21 return to their original shapes after the rotation of the rotor core 21 is stopped.

Moreover, in the rotary electric machine of the above patent document, the gaps have not been provided, and depending on the arrangement of the permanent magnets in proximity to the outer circumferential portion, the magnetic flux of the permanent magnet may become a leakage magnetic flux, and may not be effectively used. As opposed to this, in the comparative example shown in FIG. 5, slit portions B between the gaps 122 and the outer circumference of the rotor core 120 are magnetically saturated on purpose by the effect of the gaps 122, whereby a magnetic flux circuit of the permanent magnet 121 is shut off, thus making it possible to reduce the leakage magnetic flux. Moreover, in a similar way to the comparative example shown in FIG. 5, the slit portions A of the rotor core 21 only need to be magnetically saturated in the case of reducing the leakage magnetic flux in the first embodiment.

As described above, in the first embodiment, the gaps 25 for reducing the irreversible demagnetization of the permanent magnet 23 are provided on the inner circumferential surface side of the permanent magnet 23, which is also the portion of the rotor core 21 in proximity to the inner circumferential surface of the permanent magnet 23. Accordingly, unlike the case where the gaps 25 are provided in the portion of the rotor core 21 on the outer circumferential surface side of the permanent magnet 23, the permanent magnet 23 can be arranged more on the outside in the rotor core 21 since the gaps 25 are not provided on the outer circumferential surface side. As a result, a magnetic path length is relatively shortened, magnetic resistance becomes small, and an amount of the magnetic flux that reaches the outer circumferential surface of the rotor core 21 from the permanent magnet 23 becomes large. Thus, it is possible to reduce reduction of a force (magnet torque or main magnetic flux) to rotate the rotor core 21 while making it possible to reduce the irreversible demagnetization of the permanent magnet 23 by the gaps 25. Moreover, since the permanent magnet 23 can be arranged on the outside in the rotor core 21, a mass of the portion of the rotor core 21 between the permanent magnet 23 and the outer circumferential surface of the rotor core 21 becomes small, and accordingly, it is possible to reduce the deformation of the slit portions A of the rotor core 21, which may be caused by the centrifugal force by the rotation of the rotor core 21.

Moreover, in the first embodiment, as described above, the gaps 25 are provided in proximity to both end portions of the permanent magnet 23 in the direction along the rotation direction R of the rotor core 21. Accordingly, the gaps 25 are provided in proximity to both end portions of the permanent magnet 23 prone to be irreversibly demagnetized, and thus, the irreversible demagnetization of the permanent magnet 23 can be reduced more effectively.

Furthermore, in the first embodiment, as described above, the gaps 25 are formed so as to come into contact with the inner circumferential surface of the permanent magnet 23. Accordingly, unlike the case where the gaps 25 are formed at positions apart from the permanent magnet 23, the irreversible demagnetization of the permanent magnet 23 can be reduced more reliably.

Moreover, in the first embodiment, as described above, the gaps 25 are provided inside from the extensions L1 of the side end surfaces of the permanent magnet 23. In gaps formed so as to hang outside from the extensions L1 of the side end surfaces of the permanent magnet 23, a width of the rotor core between the permanent magnets becomes small. If the width of such a portion is small in the case of using a reluctance torque other than the magnet torque, then the reluctance torque cannot be used effectively due to magnetic saturation. Meanwhile, by the gaps 25 provided inside from the extensions L1 of the side end surfaces of the permanent magnet 23, the width of the rotor core 21 between the permanent magnets 23 is ensured, whereby the reluctance torque can be used effectively.

Furthermore, in the first embodiment, as described above, the radial thickness t1 of the center portion of the permanent magnet 23 is made larger than the radial thickness t2 of the end portions of the permanent magnet 23 in the direction along the rotation direction R of the rotor core 21. Accordingly, unlike the case where the permanent magnet 23 is formed into a rectangular shape (that is, the radial thickness of the center portion of the permanent magnet and the radial thickness of the end portions thereof are equalized to each other), in the case where the permanent magnets 23 are arranged adjacent to one another along the circumferential direction, mutual contact of the inside end portions of the permanent magnets 23 adjacent to one another can be avoided as much as possible by reducing the thickness t2 of the end portions (chamfering the end portions).

Moreover, in the first embodiment, as described above, each of the gaps 25 is formed so as to extend from the one side end of the rotor core 21 in the X-direction (rotation axis direction) to the other side end thereof. Accordingly, the irreversible demagnetization of the permanent magnet 23 can be reduced more in comparison with the case where each of the gaps 25 is not formed so as to extend from the one side end of the rotor core 21 in the X-direction to the other side end thereof (for example, in the case where each of the gaps 25 is formed from the one side end of the rotor core 21 to the center portion of the rotor core 21).

Furthermore, in the first embodiment, as described above, on the end portions of the rotor core 21 in the X-direction (rotation axis direction), the end rings are not provided, and the gaps 25 are exposed. Accordingly, unlike the case where the end rings are provided on the end portions of the rotor core 21 in the X-direction, an eddy current loss is not generated in portions of the end rings due to an influence of the armature reaction ampere turn from the winding 13, and thus, the irreversible demagnetization of the permanent magnet 23 caused by an influence of heat therewith can be reduced.

Moreover, in the first embodiment, as described above, the hole portions 24 for embedding the permanent magnets 23 in the rotor core 21 are provided, and the gaps 25 for reducing the irreversible demagnetization of the permanent magnets 23 are formed so as to continue with the hole portions 24. Accordingly, for example, in the case of dividing each of the permanent magnets 23 into a plurality of pieces in the axial direction and sequentially inserting the divided permanent magnets 23 into the hole portions 24, air between the divided permanent magnets 23 is discharged to the outside through the gaps 25, and thus, floating up of the permanent magnets 23 in the rotation axis direction, which is caused by the air between the permanent magnets 23 being compressed to increase a pressure thereof, can be avoided as much as possible.

(Second Embodiment)

Figure 6:
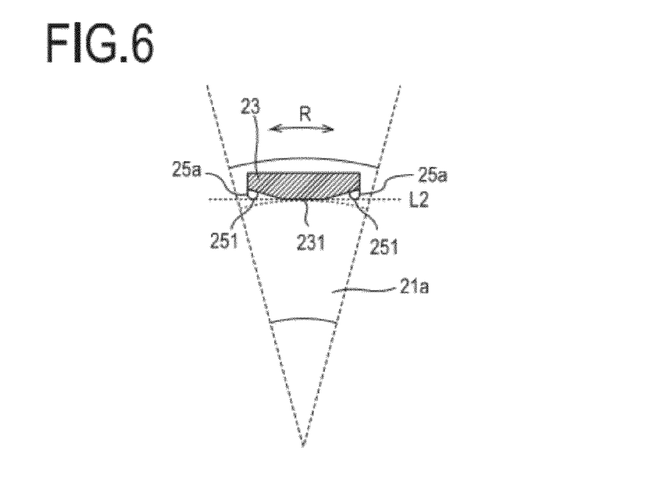
FIG. 6 is a view showing a permanent magnet and gaps per pole of a rotary electric machine according to a second embodiment of the present invention.

Next, by referring to FIG. 6, a description is made of a rotor core 21a of a second embodiment. In the second embodiment, end portions 251 on an inner circumference side of gaps 25a are located on a tangential line L2 of a circle that comes into contact with an end portion 231 on an inner circumference side of the permanent magnet 23.

As shown in FIG. 6, in the rotor core 21a of the second embodiment, the permanent magnet 23 is embedded in an outer circumferential portion of the rotor core 21a, and the gaps 25a are provided at portions in proximity to an inner circumferential surface of the permanent magnet 23, the portions also being both end portions of the permanent magnet 23 in a direction along a rotation direction R of the rotor core 21a. Here, in the second embodiment, the end portions 251 on the inner circumference side of the gaps 25a are located on the tangential line L2 of the circle that comes into contact with the end portion 231 on the inner circumference side of the permanent magnet 23. Note that other configurations of the second embodiment are similar to those of the first embodiment.

In the second embodiment, as described above, a configuration is adopted so that the end portions 251 on the inner circumference side of the gaps 25a can be located on the tangential line L2 of the circle that comes into contact with the end portion 231 on the inner circumference side of the center portion of the permanent magnet 23. Accordingly, a demagnetization tolerance in the center portion of the permanent magnet 23 and a demagnetization tolerance in the end portions of the permanent magnet 23 can be substantially equalized to each other.

(Third Embodiment)

Figure 7:
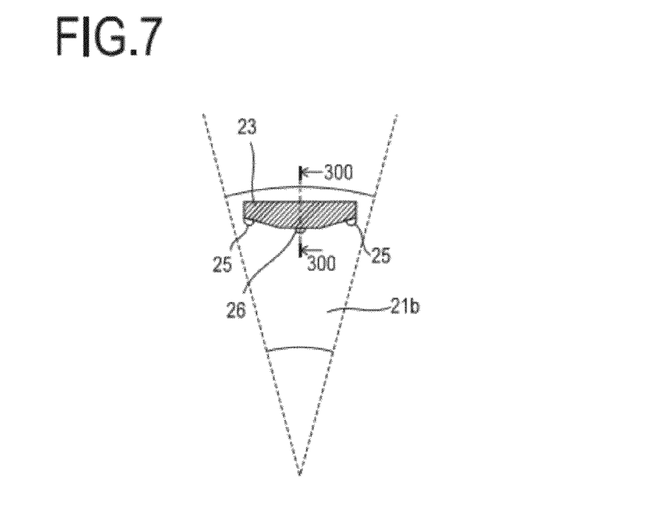
FIG. 7 is a view showing a permanent magnet and gaps per pole of a rotary electric machine according to a third embodiment of the present invention.
Figure 8:
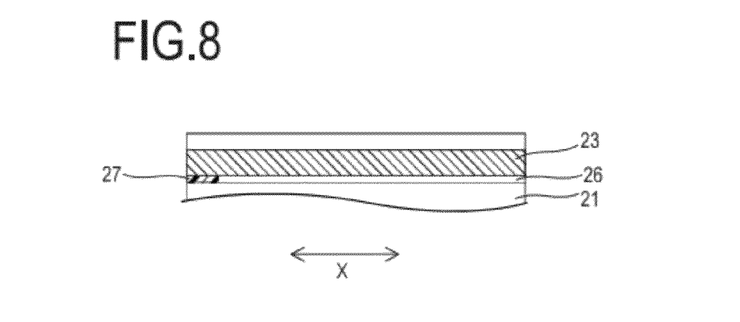
FIG. 8 is a cross-sectional view along line 300-300 of FIG. 7.

Next, by referring to FIG. 7 and FIG. 8, a description is made of a rotor core 21b of a third embodiment. In the third embodiment, in addition to the gaps 25 for reducing the irreversible demagnetization of the permanent magnet 23, a gap 26 for adjusting a residual unbalance amount of rotation of the rotor core 21b is provided.

As shown in FIG. 7, in the rotor core 21b of the third embodiment, on a portion of the rotor core 21b in proximity to the inner circumferential surface of the center portion of the permanent magnet 23, the gap 26 for adjusting the residual unbalance amount of the rotation of the rotor core 21b is provided. Moreover, as shown in FIG. 8, the gap 26 is formed so as to extend along the permanent magnet 23 from one side end of the rotor core 21b in the X-direction (rotation axis direction) to the other side end thereof. Moreover, a weight 27, which is made of resin and the like and serves for adjusting the residual unbalance amount of the rotation of the rotor core 21b, is embedded in the gap 26. Note that the gap 26 is provided on the portion of the rotor core 21b in proximity to the inner circumferential surface of each of the plurality of permanent magnets 23. Meanwhile, a plurality of the weights 27 are not provided in all of the gaps 26, but are selectively provided in the gaps 26 so as to adjust the residual unbalance amount of the rotation of the rotor core 21b. Note that other configurations of the third embodiment are similar to those for the first embodiment.

In the third embodiment, as described above, on the portion of the rotor core 21b in proximity to the inner circumferential surface of the center portion of the permanent magnet 23, the gap 26 for adjusting the residual unbalance amount of the rotation of the rotor core 21b is provided. Accordingly, even in the case where the residual unbalance amount of the rotation of the rotor core 21b cannot be removed, for example, due to variations of the arranged positions of the permanent magnets 23, variations in the arrangement of the hole portions of the rotor core after the core is stamped, and the like, the residual unbalance amount of the rotation of the rotor core 21b can be easily adjusted by embedding the weights 27 made of resin and the like in the gaps 26.

(Fourth Embodiment)

Figure 9:
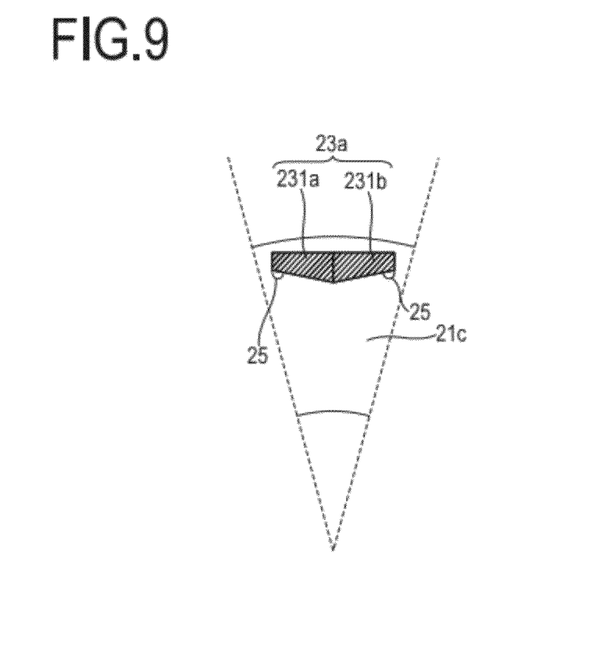
FIG. 9 is a view showing a permanent magnet and gaps per pole of a rotary electric machine according to a fourth embodiment of the present invention.
Figure 10:
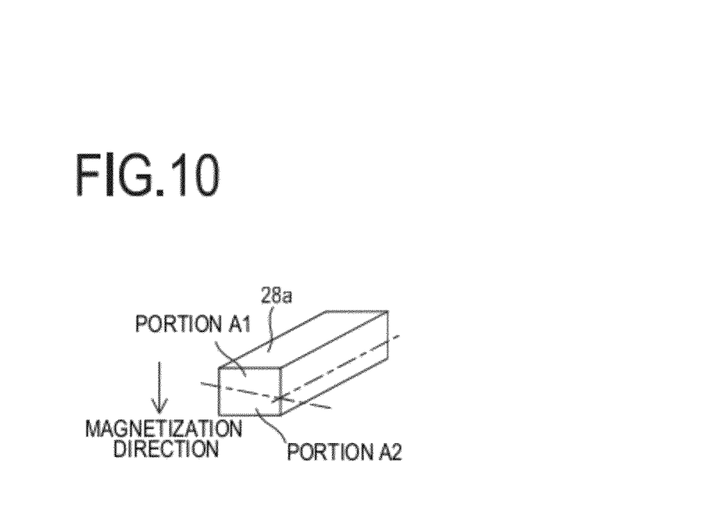
FIG. 10 is a view showing an uncut permanent magnet according to the fourth embodiment of the present invention.

Next, by referring to FIG. 9 and FIG. 10, a description is made of a rotor core 21c of a fourth embodiment. In the fourth embodiment, unlike the first to third embodiments, in each of which each of the permanent magnets 23 is made up of one permanent magnet, each of permanent magnets 23a is made up of a plurality of permanent magnets 231a and 231b.

Figure 11:
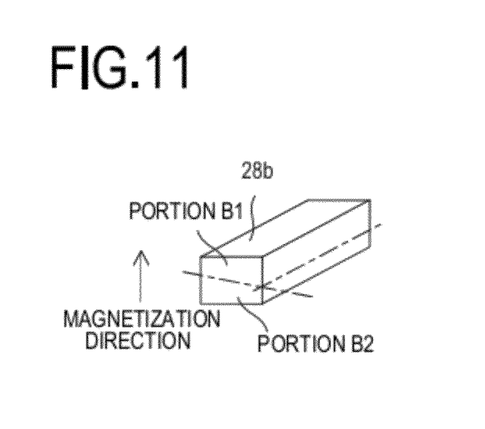
FIG. 11 is a view showing an uncut permanent magnet according to the fourth embodiment of the present invention.
Figure 12:
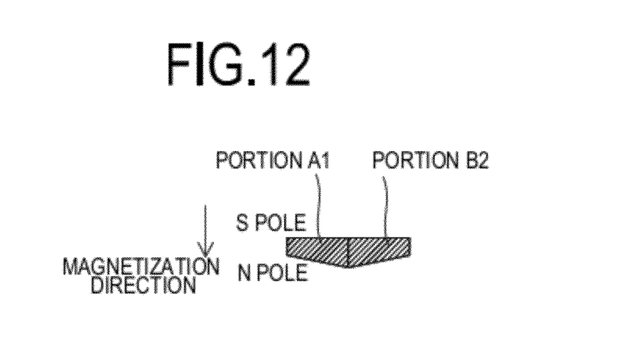
FIG. 12 is a view showing a state where the cut permanent magnets according to the fourth embodiment of the present invention are combined with each other.
Figure 13:
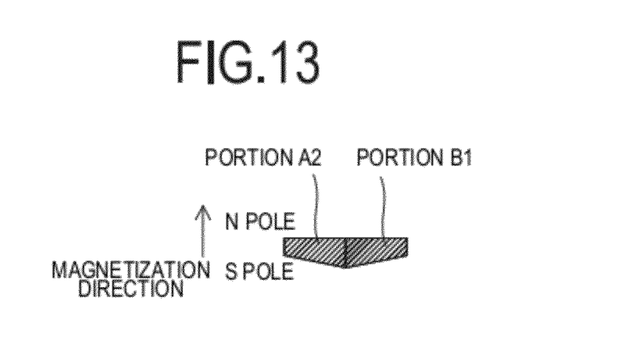
FIG. 13 is a view showing a state where the cut permanent magnets according to the fourth embodiment of the present invention are combined with each other.

As shown in FIG. 9, in the rotor core 21c of the fourth embodiment, the permanent magnet 23a having a pentagonal shape is embedded in an outer circumferential portion of the rotor core 21c. Moreover, the permanent magnet 23a is made up of two permanent magnets 231a and 231b. Furthermore, as shown in FIG. 10, each of the permanent magnets 231a and 231b is formed by dividing, into two, each of a rectangular permanent magnet 28a (refer to FIG. 10) and a rectangular permanent magnet 28b (refer to FIG. 11). Specifically, the permanent magnet 23a can be formed by a combination of a divided piece A1 of the permanent magnet 28a and a divided piece B2 of the permanent magnet 28b or a combination of a divided piece A2 of the permanent magnet 28a and a divided piece B1 of the permanent magnet 28b. Accordingly, all portions of the permanent magnets 28a and 28b can be used as the permanent magnets 231a and 231b embedded in the rotor core 21c, and thus, it becomes possible to enhance yield of the permanent magnets 28a and 28b. Note that other configurations of the fourth embodiment are similar to those of the first embodiment.

(Fifth Embodiment)

Figure 14:
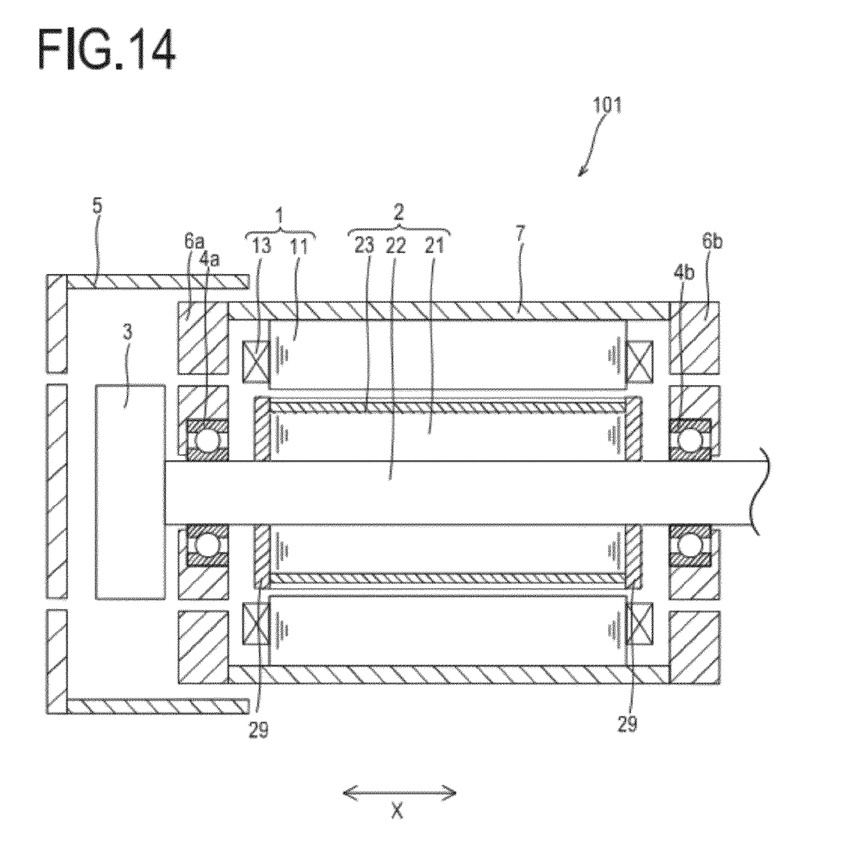
FIG. 14 is a cross-sectional view of a rotary electric machine according to a fifth embodiment of the present invention.
Figure 15:
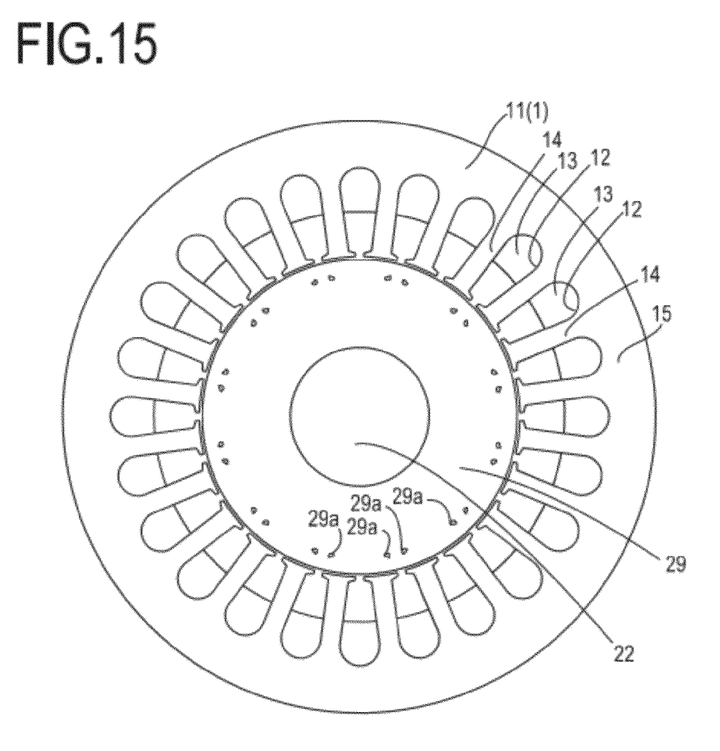
FIG. 15 is a plan view showing a stator and a rotor of a rotary electric machine according to a fifth embodiment of the present invention.

Next, by referring to FIG. 14 and FIG. 15, a description is made of a rotary electric machine 101 according to a fifth embodiment. In the fifth embodiment, unlike the first to fourth embodiments, in each of which the end rings are not provided on the rotor core 21, end rings 29 are provided on the rotor core 21.

As shown in FIG. 14, in the rotary electric machine 101 of the fifth embodiment, the end rings 29 are provided on the one side end and other side end of the rotor core 21 in the X-direction (rotation axis direction). Note that the end rings 29 are made of a non-magnetic material having a small electric conductivity. Moreover, as shown in FIG. 15, in each of the end rings 29, hole portions 29a are formed at positions corresponding to the gaps 25 (refer to FIG. 2) provided in the rotor core 21 when viewed from the above. Then, through holes are formed by the hole portions 29a of the end ring 29 provided on the one side end in the X-direction, the gaps 25 of the rotor core 21, and the hole portions 29a of the end ring 29 provided on the other side end in the X-direction. Accordingly, even in the case where, due to the influence from the windings 13, the eddy current loss is generated on a surface of the rotor core 21 and the end rings 29, and these respective regions generate heat, it becomes possible to radiate the heat to the atmosphere due to forced convection by the fan 3 through the gaps 25 of the rotor core 21, the hole portions 29a of the end rings 29, and hole portions of the brackets 6a and 6b. As a result, it becomes possible to cool the rotor core 21 and to prevent a temperature of the permanent magnets 23 from rising. Note that other configurations of the fifth embodiment are similar to those of the first embodiment.

Obviously, numerous modifications and variations of the present invention are possible in light of the above teachings. It is therefore to be understood that within the scope of the appended claims, the invention may be practiced otherwise than as specifically described herein.

Figure 16:
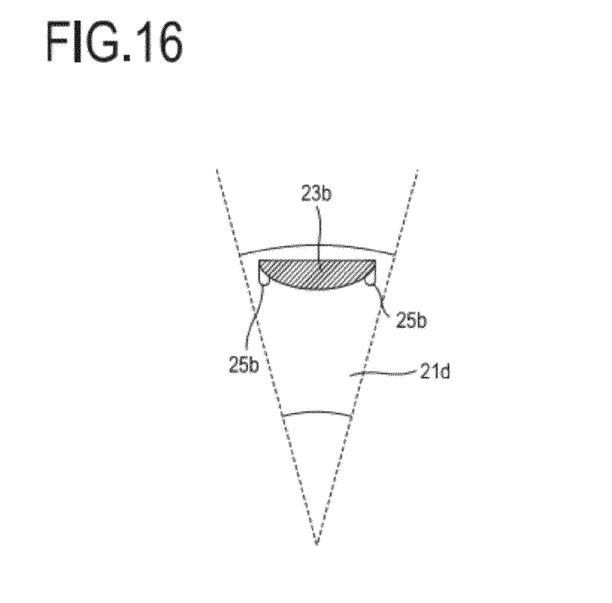
FIG. 16 is a view showing a permanent magnet and gaps per pole of a rotary electric machine according to a first modification example of the first to fifth embodiments of the present invention.
Figure 17:
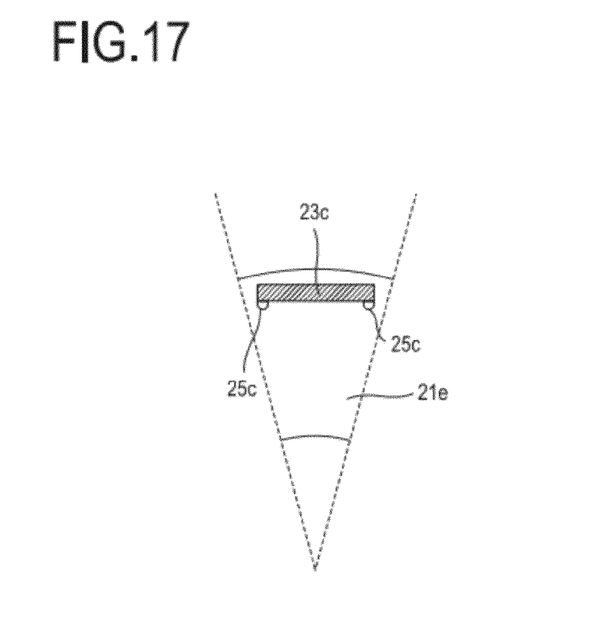
FIG. 17 is a view showing a permanent magnet and gaps per pole of a rotary electric machine according to a second modification example of the first to fifth embodiments of the present invention.
Figure 18:
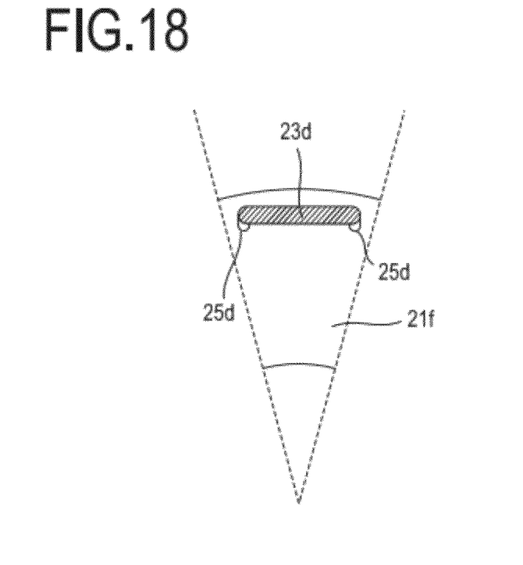
FIG. 18 is a view showing a permanent magnet and gaps per pole of a rotary electric machine according to a third modification example of the first to fifth embodiments of the present invention.
Figure 19:
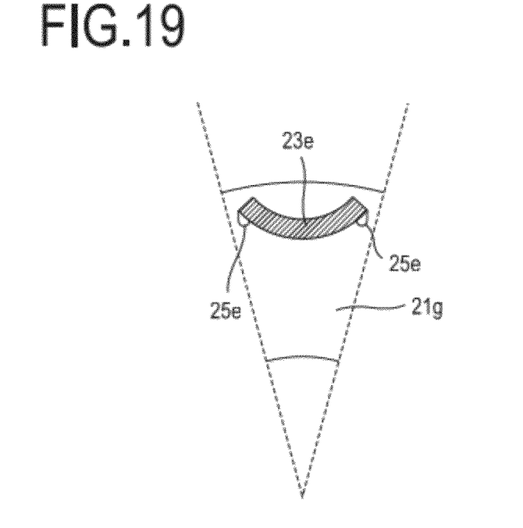
FIG. 19 is a view showing a permanent magnet and gaps per pole of a rotary electric machine according to a fourth modification example of the first to fifth embodiments of the present invention.

For example, in the first to fifth embodiments, the examples have been illustrated, in each of which the permanent magnets having the hexagonal shape (first, second, third, and fifth embodiments) or the pentagonal shape (fourth embodiment) are embedded in the rotor core; however, the present invention is not limited thereto. For example, as in a first modification example shown in FIG. 16, each of permanent magnets 23b having a substantially semicircular shape (shape obtained by cutting an ellipse along a major axis thereof) may be embedded in a rotor core 21d. Note that gaps 25b are formed in proximity to both end portions of an inner circumferential surface of the permanent magnet 23b. Moreover, as in a second modification example shown in FIG. 17, each of permanent magnets 23c having a rectangular shape may be embedded in a rotor core 21e. Note that gaps 25c are formed in proximity to both end portions of an inner circumferential surface of the permanent magnet 23c. Furthermore, as in a third modification example shown in FIG. 18, each of permanent magnets 23d having an ellipse shape may be embedded in a rotor core 21f. Note that gaps 25d are formed in proximity to both end portions of an inner circumferential surface of the permanent magnet 23d. Moreover, as in a fourth modification example shown in FIG. 19, each of permanent magnets 23e having a circular arc shape formed to protrude toward an inner circumference side may be embedded in a rotor core 21g. Note that gaps 25e are formed in proximity to both end portions of an inner circumferential surface of the permanent magnet 23e.

Moreover, in the first to fifth embodiments, the examples have been illustrated, in each of which the gaps for reducing the irreversible demagnetization of the permanent magnet are formed in proximity to both end portions of the permanent magnet; however, the present invention is not limited thereto. For example, three or more gaps may be formed in proximity to the inner circumferential surface of the permanent magnet.

Furthermore, in the first to fifth embodiments, the examples have been illustrated, in each of which the gaps for reducing the irreversible demagnetization of the permanent magnet are formed so as to continue with each of the hole portions in which the permanent magnets are embedded; however, the present invention is not limited thereto. For example, the gaps for reducing the irreversible demagnetization of the permanent magnet may be formed at positions apart from each of the hole portions in which the permanent magnets are embedded.

Moreover, in the first to fifth embodiments, the examples have been illustrated, in each of which the gaps having the substantially semicircular shape when viewed from the above are formed in the rotor core; however, the present invention is not limited to this. For example, there may be formed gaps having a substantially triangular shape, a substantially quadrangular shape, and the like when viewed from the above, which are shapes other than the substantially semicircular shape.

Furthermore, in the second embodiment, the example has been illustrated, in which the end portions on the inner circumference side of the gaps are located on the tangential line of the circle that comes into contact with the end portion on the inner circumference side of the permanent magnet; however, the present invention is not limited thereto. In the present invention, the end portions on the inner circumference side of the gaps only need to be located in proximity to the tangential line of the circle that comes into contact with the end portion on the inner circumference side of the permanent magnet.

Figure 20:
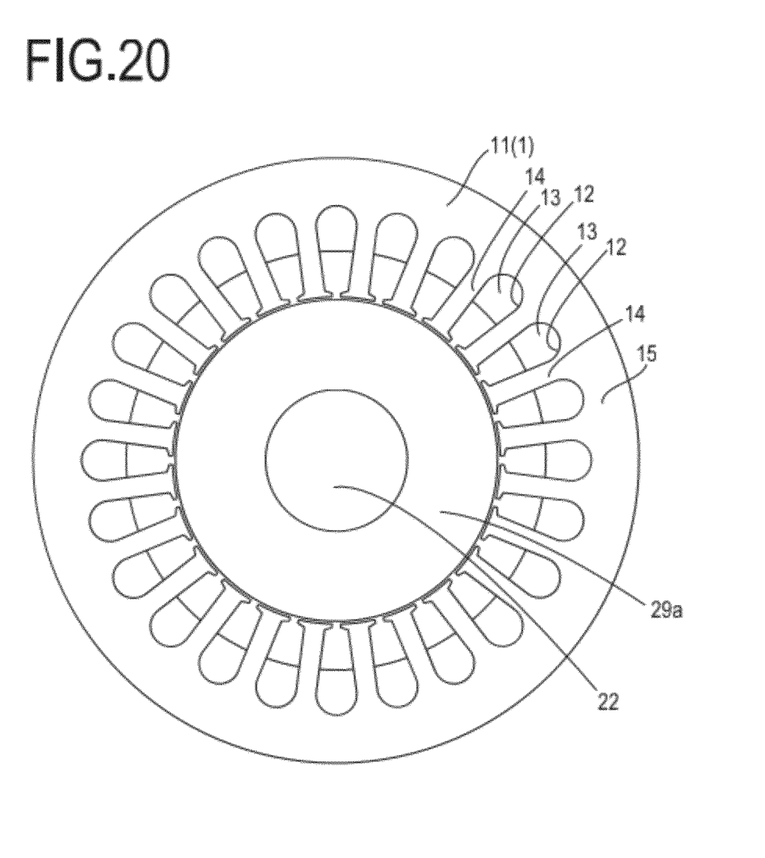
FIG. 20 is a view showing an end ring of a rotary electric machine according to a modification example of the fifth embodiment of the present invention.

Moreover, in the fifth embodiment, the example has been illustrated, in which the end rings having the hole portions are provided on the rotor core; however, the present invention is not limited thereto. For example, as in a modification example of the fifth embodiment, which is shown in FIG. 20, hole portions with a shape different from that of the hole portions 29a may be provided in the end rings 29.

Furthermore, in each of the first to fifth embodiments, the configuration has been adopted, in which the fan 3 and the fan cover 5 are provided, and vent holes are provided in the brackets 6a and 6b; however, the present invention is not limited thereto. A configuration may be adopted, in which the fan 3 and the fan cover 5 are not provided, and the vent holes are not provided in the brackets 6a and 6b.

Moreover, the rotary electric machine according to the present invention, which is illustrated in each of the first to fifth embodiments, may be one of a motor and a generator.

What is claimed as new and is desired to be secured by Letters Patent of the United States is:

1. A rotary electric machine comprising:
a rotor core; and
a permanent magnet embedded in proximity to an outer circumferential portion of the rotor core, wherein
gaps for reducing irreversible demagnetization of the permanent magnet are provided on portions on an inner circumference side of the permanent magnet, the portions being of the rotor core in proximity to an inner circumferential surface of the permanent magnet, and
the gaps are provided radially inward of both circumferential end surfaces of the permanent magnet.

2. The rotary electric machine according to claim 1, wherein the gaps are provided to come into contact with the inner circumferential surface of the permanent magnet.

3. The rotary electric machine according to claim 1, wherein the gaps are provided inside from extensions of the circumferential end surfaces of the permanent magnet.

4. The rotary electric machine according to claim 1, wherein a radial thickness of a center portion of the permanent magnet is configured to be larger than a radial thickness of end portions of the permanent magnet in a direction along a rotation direction of the rotor core.

5. The rotary electric machine according to claim 1, wherein end portions on an inner circumference side of the gaps is configured to be located in proximity to a tangential line of a circle that comes into contact with an end portion on an inner circumference side of a center portion of the permanent magnet.

6. The rotary electric machine according to claim 1, wherein each of the gaps is formed to extend from one side end of the rotor core in a rotation axis direction to the other side end of the rotor core in the rotation axis direction.

7. The rotary electric machine according to claim 1, wherein end rings are not provided on end portions of the rotor core in a rotation axis direction, and the gaps are exposed.

8. The rotary electric machine according to claim 1, wherein end rings are provided on end portions of the rotor core in a rotation axis direction, and the gaps are covered with the end rings.

9. The rotary electric machine according to claim 1, wherein a gap for adjusting a balance of rotation of the rotor core is provided on a portion of the rotor core in proximity to an inner circumferential surface of a center portion of the permanent magnet.

10. The rotary electric machine according to claim 1, wherein a hole portion for embedding the permanent magnet in the rotor core is formed in the rotor core, and the gaps for reducing the demagnetization of the permanent magnets are formed to continue with the hole portion.

11. The rotary electric machine according to claim 1, further comprising:

a stator core arranged to face the rotor core in a radial direction, wherein a plurality of the permanent magnets are embedded to be arranged at a substantially equal interval in a circumferential direction of the rotor core, and the gaps are configured to reduce irreversible demagnetization of the permanent magnets, the irreversible demagnetization caused by a magnetomotive force generated from the stator core side.

12. The rotary electric machine according to claim 1, wherein a plurality of the permanent magnets are provided, each of which is embedded in proximity to the outer circumferential portion of the rotor core, and each of the plurality of permanent magnets is formed by dividing one permanent magnet into a plurality of pieces and combining a plurality of the divided permanent magnets with each other.

* * * * *